Sept. 29, 1970 R. D. MICHIK 3,531,755
ROTARY POTENTIOMETER TERMINATION SPRING
Filed March 28, 1969
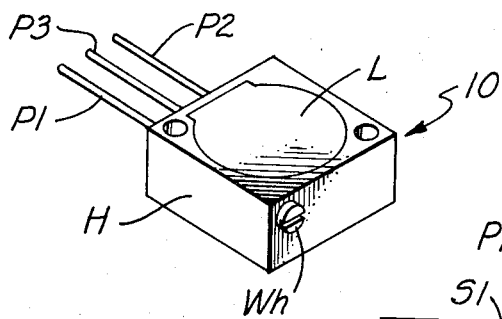
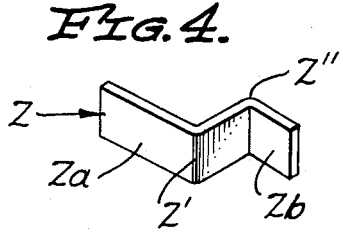
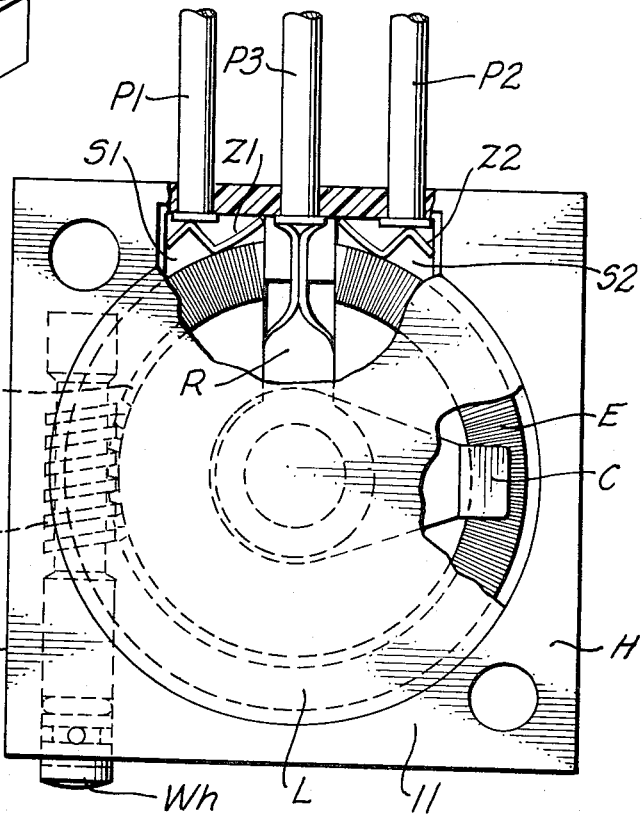
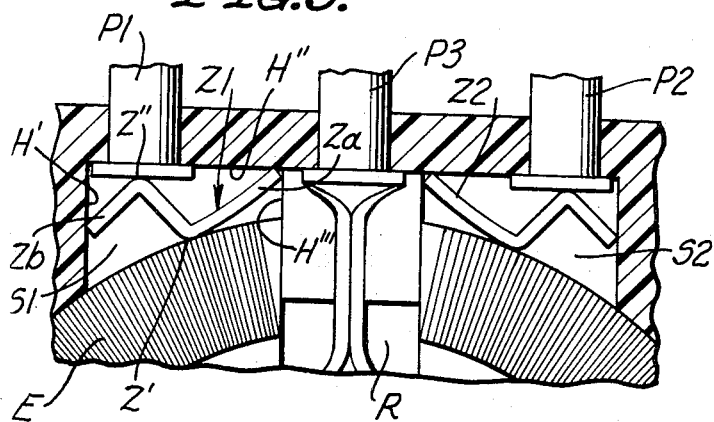
INVENTOR
ROBERT D. MICHIK

United States Patent Office 3,531,755
Patented Sept. 29, 1970

---

3,531,755
ROTARY POTENTIOMETER TERMINATION SPRING
Robert D. Michik, Riverside, Calif., assignor to Bourns, Inc., a corporation of California
Filed Mar. 28, 1969, Ser. No. 811,284
Int. Cl. H01c 1/14
U.S. Cl. 338—162                                    4 Claims

ABSTRACT OF THE DISCLOSURE

An inexpensive simple doubly-bent leaf spring quickly and easily snapped into place between a molded-in pin terminal and an arcuate wirewound resistance element whereby very accurate termination of an arcuate wirewound element is quickly and inexpensively effected.

BACKGROUND OF THE INVENTION

In the prior art, terminations of the first and second ends of wirewound resistance elements in single-turn rotary potentiometers, whether of the gear-adjusted type or other, have been effected by soldering or welding of a wire to a respective end of the element, the wire extending outwardly of the potentiometer case and forming the terminal, or the wire further being soldered or welded to a rigid terminal member which may be embedded in the case. Typical examples are illustrated in U.S. Pats. Nos. 2,121,983, 2,266,188, and 3,311,861. In U.S. Pat. No. 2,066,835 a clip held in place by a screw-terminal had a solder connection to the resistance wire of the element, or the wire was passed under the clamp and held thereagainst by the screw. None of these modes of termination permitted accurate establishment of either electrical end of the element from potentiometer to potentiometer; that is, uniformity of terminations was not attained, and in all such constructions the manual operation of soldering or welding was involved, rendering the terminations expensive, especially in those cases in which the potentiometer was of small size or the resistance wire was of fine gauge.

SUMMARY OF THE INVENTION

The present invention provides an inexpensive means for very quickly and easily effecting uniform and precise terminations of arcuate resistance element, whether wirewound or of other types, by utilization of a reversely-bent flat leaf of conductive spring stock which is configured to fit, under stress, in a complementary recess formed by the casing or shell of the potentiometer, with its elbows pressing against and in electrical contact with respective ones of a fixed terminal and a portion of the element. The ends of the spring, which may be considered to be of open-Z form, bear against flat surfaces of the casing, while the bends or elbows press in opposite directions, one against the terminal and the other against an end portion of the arcuate resistance element and thus accurately determine an electrical end of the element. Since the spring may be die-formed and cut from a strip of spring material, it is inexpensively produced; and since it is readily pressed into operative position either manually or by mechanical means very rapidly and without any special or expensive equipment, it concurrently improves the accuracy of the termination while reducing the cost of making the latter. The invention in preferred exemplary form is illustrated in the accompanying drawings.

DESCRIPTION OF THE DRAWINGS

In the drawings,
FIG. 1 is a pictorial view, grossly enlarged, of a potentiometer in which the invention is illustratively embodied;

FIG. 2 is a still further enlarged plan view of the potentiometer depicted in FIG. 1, with parts broken away to show internal details, and with adjusting mechanism components indicated in phantom;

FIG. 3 is a fragmentary view of certain portions of the potentiometer shown in FIG. 2, to still further enlarged scale, showing an exemplary arrangement of terminal connections; and FIG. 4 is a pictorial view, to greatly enlarged scale, of a reversely-bent leaf spring termination spring according to the invention and as employed in the potentiometer illustrated in FIGS. 1, 2 and 3.

DESCRIPTION OF THE ILLUSTRATED INVENTION

In FIGS. 1 and 2, numeral 10 designates a screw-adjusted potentiometer of the wormscrew type, in which rotary means such as a wormscrew W is rotated (as by a screwdriver applied to head Wh of the screw) to rotate a complementary gear G to drive a contact C along a circular path which includes an arcuate contact zone along an exopsed contact surface of a resistance element E. The contact C may be driven by direct positive connection to gear G, or by frictional engagement with the gear, as is known in the art. The aforementioned operating components are, or may be, of type well known in the art and such as are illustrated in Pats. Nos. 3,096,498, 3,099,810, and 3,124,777, for example. The operating components are housed in the interior of a casing or housing H of box-like form and which is closed by a cover or lid L. The housing H, which is of insulation such as Bakelite or synthetic resin, has mounted therein or affixed thereto as by being molded in, first, second and third conductive terminal pins P1, P2 and P3, adapted to be connected to the element E and the contact C. The element E is of arcuate form, disposed upon the floor of the chamber formed by the box of the housing H, with its ends spaced apart by an upstanding portion of the floor of the housing. The element may be secured in place by nonconductive adhesive, for example.

The contact C has a central hub portion rotatable on the same gudgeon or pin as gear G, and thereby brushes on a conductive return or collector member R which encircles the gudgeon or pin and extends outwardly into contact with terminal pin P3 (FIG. 2).

Disposed in spaces or recesses S1 and S2 (FIGS. 2 and 3), between element E and internal walls H', H" and H'" of the box of housing H, are first and second termination springs Z1 and Z2 which are or may be identical and which are of construction the same as spring Z depicted in FIG. 4. In the latter figure, it is made evident that the spring is of flat strip material having first and second reversely directed elbows or bends, Z' and Z", whereby the spring is of open-Z form or configuration. One end portion or limb, Za, adjacent elbow Z', is longer than the other end portion, Zb. Thus forces may be applied to the elbows and the end adjacent elbow Z', which tend to deform the spring whereby it may be considered to be compressed in one direction and whereby it can be inserted into either of the noted spaces S1 and S2, and whereby when then released, the end of the short limb Zb will engage wall H' of the space S1 for example, elbow Z" will engage and press against the base end of terminal P1 for example, elbow Z' will press against element E, and the end of the longer limb Za will press against walls H" and H'" of the space, the longer limb bowing very slightly and the end corners of the longer limb tending to embed in the adjacent walls of the housing. Thus elbow Z' will be quite precisely located along the end portion of the element E, and will be very firmly maintained in electrical contact therewith; and elbow Z" will similarly be held in firm electrical contact with the terminal. As is evident, then, the angular distance between the points where the contact springs Z1 and Z2 engage the element E will be the same from one to any other of a series of the potentiometers, whereby total resistance (TR), as measured between terminals P1 and P2, will be accurately the same. In soldered or welded terminations, the extent of spread of solder or weld is not closely controllable, with the consequence that TR among a group of potentiometers of the same class varies considerably, despite exercise of care in effecting the soldering or welding. As is evident the principle of the stressed reversely-bent leaf spring inserted between a resistance element and a fixed terminal, to electrically connect the latter with the former at a determined point on the element with the spring exerting force against both, can be equally well applied to other than the specific exemplary potentiometer depicted, it being only necessary that the spring be conductive and confined and stressed in the manner described.

I claim:
1. A potentiometer comprising, in combination:
   housing means providing a chamber for reception of operating components and electrical components, said housing means including means forming interior walls;
   operating components, including a movable contact means and means to traverse the contact along a path, and terminal means for said contact means;
   an arcuate resistance element in said housing means, said element having between first and second ends thereof a contact zone exposed along said path for contact by said contact means;
   a pair of fixed terminals on said housing means, each having an end thereof exposed in said chamber adjacent a respective pair of portions of said walls and adjacent an end of said resistance element; and
   at least one reversely-bent leaf spring having first and second oppositely-directed elbows, said spring having first and second end portions and a portion between said elbows, said spring being stressed and confined between a pair of portions of said walls with the said first elbow thereof pressing against a first one of said fixed terminals and said second elbow pressing against one of the ends of said element, whereby to electrically connect said first one of said terminals with said resistance element.

2. A potentiometer according to claim 1, in which said arcuate resistance element has ends abutting respective ones of first and second oppositely-facing walls of said walls, and in which said opposite end portions of said leaf spring are of unequal length and the longer end portion thereof is slightly bowed.

3. A potentiometer according to claim 1, in which each end portion of said resistance element has a respective stressed reversely-bent leaf spring bearing thereon and pressing against a respective one of said pair of fixed terminals, whereby to electrically connect respective ones of said pair of terminals to respective end portions of said resistance element.

4. A potentiometer according to claim 3, in which among said means forming interior walls are means serving to accurately position the second elbows of said stressed reversely-bent leaf springs relative to said element, whereby to accurately define the electrical length of said element connected between said second elbows.

References Cited
UNITED STATES PATENTS 3,124,777   3/1964   Mellor _____ 338—174
3,264,594   8/1966   Layland _____ 338—174

LEWIS H. MYERS, Primary Examiner

D. A. TONE, Assistant Examiner

U.S. Cl. X.R.
338—174, 326